United States Patent

Bloom

[15] 3,653,300

[45] Apr. 4, 1972

[54] BELLOWS UNIT

[72] Inventor: Joseph Lewis Bloom, Baie D'Urfe, Quebec, Canada

[73] Assignee: Joseph Lucas (Industries) Limited, Birmingham, England

[22] Filed: Apr. 29, 1970

[21] Appl. No.: 32,821

[52] U.S. Cl. ................................92/13.2, 73/407
[51] Int. Cl. ..........................................F01b 19/00
[58] Field of Search .................92/13.1, 13.2, 13.4, 39; 73/407

[56] References Cited

UNITED STATES PATENTS

| 2,254,539 | 2/1941 | Mattox | 92/13.2 X |
| 3,162,335 | 12/1964 | Kogan et al. | 92/13.2 X |
| 3,354,722 | 11/1967 | Waite et al. | 92/39 X |
| 3,375,721 | 4/1968 | Joesting | 73/407 |

FOREIGN PATENTS OR APPLICATIONS

| 1,190,770 | 10/1959 | France | 92/13.2 |

Primary Examiner—Edgar W. Geoghegan
Assistant Examiner—Leslie J. Payne
Attorney—Holman & Stern

[57] ABSTRACT

The invention relates to a bellows unit in which expansion of a bellows rotates an output spindle. The spindle is engaged with the bellows via a lever arm formed with recesses at different distances from the spindle. A thrust member is locatable in any recess and engages an end of the bellows, whereby the torque exerted by the bellows on the spindle is adjustable.

5 Claims, 3 Drawing Figures

Patented April 4, 1972
3,653,300
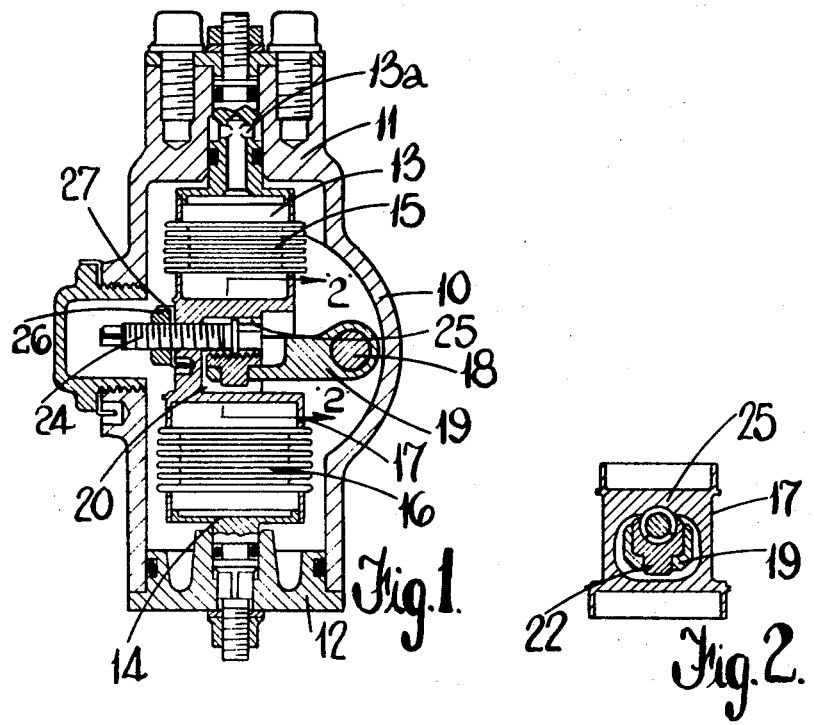
Fig.1.
Fig.2.
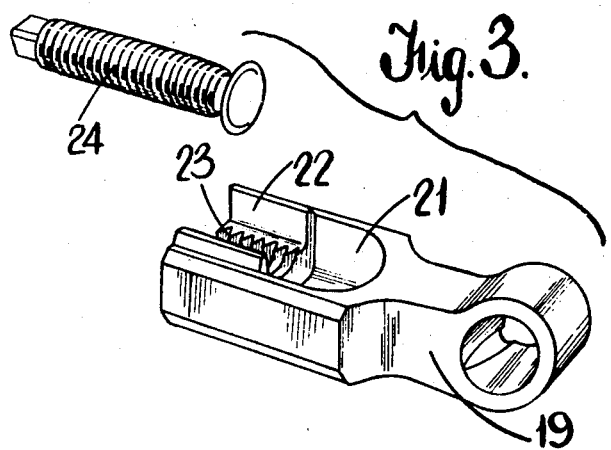
Fig.3.
INVENTOR
Joseph Lewis Bloom.
Holman, Glascock, Downing & Seebold
ATTORNEYS

BELLOWS UNIT

This invention relates to a bellows unit and has as an object to provide a bellows unit in a convenient form.

A bellows unit in accordance with the invention comprises a bellows, an end member on the bellows and movable on expansion and contraction of the bellows in response to a pressure difference between the inside and outside of the bellows, a pivot whose axis is substantially perpendicular to the direction of movement of the end member, an arm secured to the pivot and having thereon a contact part formed with a series of recesses which are spaced at different distances from the axis of the pivot, a thrust member mounted on the end member and movable into locating engagement with a desired one of the said recesses, and locking means for securing the thrust member relative to the end member, whereby the moment of the force applied by the bellows to the pivot through the intermediary of the thrust member and the arm may be varied by adjustment of the thrust member.

An example of the invention is shown in the accompanying drawings in which:

FIG. 1 is a cross-section through an example of a bellows unit in accordance with the invention;

FIG. 2 is a fragmentary section on line 2—2 in FIG. 1; and

FIG. 3 is an exploded perspective view of a part of the unit shown in FIG. 1.

The unit shown includes a housing 10 with a fixed end wall 11 and a removable end wall 12. Adjustably secured to the fixed and movable end walls 11, 12 respectively are a pair of bellows supports 13, 14. The bellows 15, 16 are sealingly attached to the bellows supports 13, 14 respectively.

The end of the bellows 15, 16 are attached to opposite ends of an end member 17. In the arrangement shown the interior of the bellows 16 is evacuated and passages 13a are formed in the bellows support 13 to allow fluid under pressure to enter the bellows 13. Fluid at a different pressure is introduced into the housing 10 and the unit is required to provide an output force which is a function of these two pressures.

The output is extracted from the unit by means of spindle 18 to which an arm 19 is secured. The arm 19 projects into a recess 20 in the side of the end member 17. The end of the arm 19 is formed with a recess 21 in which a contact member 22 is mounted. The contact member 22 may be formed of a hard synthetic resin material such as nylon, or from sintered metal. The contact member 22 is basically of channel-shaped configuration and its base is formed internally with a series of recesses 23 which are spaced by different distances from the axis of the spindle 18.

Co-acting with the contact member 22 is a thrust member in the form of the head of a screw-threaded member 24 screw-threadedly engaged with the end member 17. The head of the screw-threaded member 24 is of disc-shaped configuration with a rounded periphery which can enter the recesses 23. The end member 17 also has a thrust face which is formed with a shallow groove 25 extending in the direction of the axis of the screw-threaded member 24 and the head of the screw-threaded member 24 engages in this groove 25. As will be seen from the drawing, therefore, the thrust which is applied to the end member 17 by the bellows is transferred through the head of the screw-threaded member 24 to the contact member 23 and thence to the arm 19 and the spindle 18. By selecting a different one of the recesses 23 for engagement with the head of the member 24 the moment of the force applied to the arm 19 about the axis of the spindle 18 can be varied so that the torque applied to the spindle 18 is likewise varied. A lock nut 26 is provided on the member 24 for locking this in its adjusted position, a deformable locking washer 27 being provided for preventing rotation of the lock nut.

It will be noted that, as well as providing easy adjustment of the bellows unit, the arrangement described above also ensures that movements of the member 17 in directions perpendicular to the axes of the bellows are prevented in service. This has the result of reducing the effect of vibration on the bellows, the life span of which is thereby increased.

Having thus described my invention what I hereby claim as new and desire to secure by Letters Patent is:

1. A bellows unit comprising a bellows, an end member on the bellows and movable on expansion and contraction of the bellows in response to a pressure difference between the inside and the outside of the bellows, a spindle whose axis is substantially perpendicular to the direction of movement of the end member, an arm secured to the spindle and having thereon a contact part formed with a series of recesses which are spaced at different distances from the axis of the spindle, a thrust member screw-threadedly engaged with the end member for movement in a direction substantially perpendicular both to the direction of movement of the end member and to the axis of the spindle and selectively engageable with any desired one of the said recesses, and locking means for securing the thrust member relative to the end member, whereby the moment of the force applied by the bellows to the spindle through the intermediary of the thrust member and the arm may be varied by adjustment of the thrust member.

2. A unit as claimed in claim 1 in which the thrust member is formed with a head engageable both with the said recesses and with the end member.

3. A unit as claimed in claim 2 in which the said recesses and the head are formed so as to prevent relative movement between the arm and the contact member in directions parallel to the axis of the spindle.

4. A unit as claimed in claim 3 in which the end member is formed with a groove in which the head of the thrust member is located so as to prevent relative movement between the thrust member and the end member in directions parallel to the axis of the spindle.

5. A bellows unit comprising a pair of bellows, an end member sealingly secured to both bellows and movable in response to pressure differences between the insides and the outsides of the bellows, a casing surrounding the bellows means for introducing a fluid pressure into one of the bellows, the inside of the said casing being at a different pressure, a spindle whose axis is substantially perpendicular to the direction of movement to the under member, an arm secured to the spindle and having thereon a contact part formed with a series of recesses which are spaced at different distances from the axis of the spindle, a thrust member screw-threadedly engaged with the end member and movable, in a direction substantially perpendicular to the axis of the spindle, into locating engagement with any desired one of said recesses the recesses of the end member being formed so that the thrust member in use acts to prevent relative movement between the said end member and the arm in a direction parallel to the axis of the spindle and rocking means for securing the thrust member to the end member, whereby the moment of a force applied by a bellows to the spindle through the intermediary of the thrust member and the arm may be varied by adjustment of the thrust member.

* * * * *